(12) United States Patent
Vainstein (10) Patent No.: US 7,702,909 B2
(45) Date of Patent: Apr. 20, 2010

(54) METHOD AND SYSTEM FOR VALIDATING TIMESTAMPS

(76) Inventor: Klimenty Vainstein, 10526 N. Foothill Blvd., #A, Cupertino, CA (US) 95014

( * ) Notice: Subject to any disclaimer, the term of this patent is extended or adjusted under 35 U.S.C. 154(b) by 690 days.

(21) Appl. No.: 10/745,183

(22) Filed: Dec. 22, 2003

(65) Prior Publication Data
US 2005/0138383 A1      Jun. 23, 2005

(51) Int. Cl.
 *H04L 9/32* (2006.01)
(52) U.S. Cl. .................. 713/178; 713/156; 713/157; 709/223; 709/224
(58) Field of Classification Search ................ 713/178, 713/156, 157; 709/224, 223
See application file for complete search history.

(56) References Cited

U.S. PATENT DOCUMENTS

| | | | | |
|---|---|---|---|---|
| 4,912,552 | A * | 3/1990 | Allison et al. | 725/21 |
| 5,032,979 | A * | 7/1991 | Hecht et al. | 726/25 |
| 5,212,788 | A * | 5/1993 | Lomet et al. | 707/201 |
| 5,467,342 | A * | 11/1995 | Logston et al. | 370/253 |
| 5,640,388 | A * | 6/1997 | Woodhead et al. | 370/468 |
| 5,661,668 | A * | 8/1997 | Yemini et al. | 702/186 |
| 5,689,688 | A * | 11/1997 | Strong et al. | 713/375 |
| 5,745,750 | A * | 4/1998 | Porcaro | 707/102 |
| 5,778,350 | A * | 7/1998 | Adams et al. | 707/1 |
| 6,031,584 | A * | 2/2000 | Gray | 375/240.28 |
| 6,070,244 | A * | 5/2000 | Orchier et al. | 726/1 |
| 6,148,338 | A * | 11/2000 | Lachelt et al. | 709/224 |
| 6,199,070 | B1 * | 3/2001 | Polo-Wood et al. | 707/202 |
| 6,249,755 | B1 * | 6/2001 | Yemini et al. | 702/183 |
| 6,347,374 | B1 * | 2/2002 | Drake et al. | 726/1 |
| 6,385,644 | B1 * | 5/2002 | Devine et al. | 709/206 |
| 6,405,318 | B1 * | 6/2002 | Rowland | 726/22 |
| 6,408,404 | B1 * | 6/2002 | Ladwig | 714/39 |
| 6,687,752 | B1 * | 2/2004 | Falco et al. | 709/230 |
| 6,698,022 | B1 * | 2/2004 | Wu | 725/111 |
| 6,751,573 | B1 * | 6/2004 | Burch | 702/178 |

(Continued)

OTHER PUBLICATIONS

Windows NT Workstation Resource Kit, Jul. 1997, Microsoft Press, Chapter 37.*

(Continued)

*Primary Examiner*—Christian LaForgia
*Assistant Examiner*—James Turchen
(74) *Attorney, Agent, or Firm*—Sterne Kessler Goldstein & Fox PLLC (57) ABSTRACT

Improved techniques for validating timestamps used in a client-server environment are disclosed. A client can associate client-provided timestamps with events that occur at the client. The client can then send event information as well as the timestamps to a server. Preferably, the event information and timestamps are sent in a batch pertaining to a plurality of events that have occurred at the client. The server, which has greater time accuracy, can then validate the client-provided timestamps. The server can also modify the client-provided timestamps so as to improve accuracy of the timestamps. Once modified, the timestamps can pertain to a range (e.g., window) of time during which the associated events can be known to have reliably occurred. In one embodiment, the client-server environment is a distributed file security system in which the events and event information pertain to audit files. The distributed file security system provides efficient and reliable techniques to ensure accuracy of client-provided timestamps.

35 Claims, 6 Drawing Sheets

U.S. PATENT DOCUMENTS

| | | | | |
|---|---|---|---|---|
| 6,754,657 | B2* | 6/2004 | Lomet | 707/8 |
| 6,779,031 | B1* | 8/2004 | Picher-Dempsey | 709/224 |
| 6,816,969 | B2* | 11/2004 | Miyazaki et al. | 713/180 |
| 6,842,825 | B2* | 1/2005 | Geiner et al. | 711/133 |
| 6,870,920 | B2* | 3/2005 | Henits | 379/207.02 |
| 6,877,010 | B2* | 4/2005 | Smith-Semedo et al. | 707/102 |
| 6,882,994 | B2* | 4/2005 | Yoshimura et al. | 707/3 |
| 6,961,855 | B1* | 11/2005 | Rich et al. | 726/1 |
| 6,968,456 | B1* | 11/2005 | Tripathi et al. | 713/185 |
| 6,978,376 | B2* | 12/2005 | Giroux et al. | 713/189 |
| 7,000,150 | B1* | 2/2006 | Zunino et al. | 714/38 |
| 7,047,404 | B1* | 5/2006 | Doonan et al. | 713/156 |
| 7,107,185 | B1* | 9/2006 | Yemini et al. | 702/183 |
| 7,126,957 | B1* | 10/2006 | Isukapalli et al. | 370/412 |
| 7,496,959 | B2* | 2/2009 | Adelstein et al. | 726/21 |
| 2001/0033611 | A1* | 10/2001 | Grimwood et al. | 375/219 |
| 2002/0026321 | A1* | 2/2002 | Faris et al. | 705/1 |
| 2002/0027886 | A1* | 3/2002 | Fischer et al. | 370/255 |
| 2002/0036984 | A1* | 3/2002 | Chiussi et al. | 370/232 |
| 2002/0050098 | A1* | 5/2002 | Chan | 49/42 |
| 2002/0056042 | A1* | 5/2002 | van der Kaay et al. | 713/178 |
| 2002/0089602 | A1* | 7/2002 | Sullivan | 348/500 |
| 2002/0093527 | A1* | 7/2002 | Sherlock et al. | 345/736 |
| 2002/0120851 | A1* | 8/2002 | Clarke | 713/178 |
| 2002/0129158 | A1* | 9/2002 | Zhang et al. | 709/234 |
| 2002/0138571 | A1* | 9/2002 | Trinon et al. | 709/204 |
| 2002/0138762 | A1* | 9/2002 | Horne | 713/201 |
| 2002/0152302 | A1* | 10/2002 | Motoyama et al. | 709/224 |
| 2002/0165870 | A1* | 11/2002 | Chakraborty et al. | 707/206 |
| 2002/0169963 | A1* | 11/2002 | Seder et al. | 713/176 |
| 2002/0174109 | A1* | 11/2002 | Chandy et al. | 707/3 |
| 2002/0174415 | A1* | 11/2002 | Hines | 717/127 |
| 2003/0005168 | A1* | 1/2003 | Leerssen et al. | 709/313 |
| 2003/0037029 | A1* | 2/2003 | Holenstein et al. | 707/1 |
| 2003/0061506 | A1* | 3/2003 | Cooper et al. | 713/201 |
| 2003/0095552 | A1* | 5/2003 | Bernhard et al. | 370/395.21 |
| 2003/0099248 | A1* | 5/2003 | Speciner | 370/412 |
| 2003/0154396 | A1* | 8/2003 | Godwin et al. | 713/201 |
| 2003/0159048 | A1* | 8/2003 | Matsumoto et al. | 713/178 |
| 2003/0163704 | A1* | 8/2003 | Dick et al. | 713/178 |
| 2003/0165117 | A1* | 9/2003 | Garcia-Luna-Aceves et al. | 370/238 |
| 2003/0182310 | A1* | 9/2003 | Charnock et al. | 707/104.1 |
| 2003/0204692 | A1* | 10/2003 | Tamer et al. | 711/163 |
| 2003/0208485 | A1* | 11/2003 | Castellanos | 707/5 |
| 2003/0212828 | A1* | 11/2003 | Miyazaki et al. | 709/248 |
| 2003/0217292 | A1* | 11/2003 | Steiger et al. | 713/201 |
| 2003/0220999 | A1* | 11/2003 | Emerson | 709/224 |
| 2003/0222141 | A1* | 12/2003 | Vogler et al. | 235/385 |
| 2004/0073718 | A1* | 4/2004 | Johannessen et al. | 709/400 |
| 2005/0050098 | A1* | 3/2005 | Barnett | 707/104.1 |
| 2005/0138383 | A1* | 6/2005 | Vainstein | 713/178 |
| 2006/0149407 | A1* | 7/2006 | Markham et al. | 700/108 |
| 2006/0277316 | A1* | 12/2006 | Wang et al. | 709/231 |
| 2008/0075126 | A1* | 3/2008 | Yang | 370/509 |

OTHER PUBLICATIONS

Willaim R. Stanek, Microsoft Windows NT 4.0 Administrator's Pocket Consultant, Mar. 1999, Microsoft Press, Chapter 3—Event Logging and Viewing.*

* cited by examiner

METHOD AND SYSTEM FOR VALIDATING TIMESTAMPS

CROSS-REFERENCE TO RELATED APPLICATIONS

This application is related to U.S. patent application Ser. No. 10/642,041, filed Aug. 15, 2003, and entitled "METHOD AND SYSTEM FOR FAULT-TOLERANT TRANSFER OF FILES ACROSS A NETWORK," which is hereby incorporated herein by reference. This application is also related to U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated herein by reference.

BACKGROUND OF THE INVENTION

1. Field of the Invention

The present invention relates to time stamping in a client-server environment and, more particularly, to security systems that provide reliable timestamps for audit purposes.

2. Description of the Related Art

Security systems can be used to restrict access to files (e.g., documents) through use of cryptography. Such security systems are often called file security systems or document security systems. Typically, the files (e.g., documents) are encrypted using a public key and then later decrypted by only those authorized users having an appropriate private key. It is advantageous to monitor events (e.g., security events or audit events) of file security systems that occur over time. In this regard, file security systems can audit or log security events to an audit file (or log file). In cases where access to files cannot be restricted, it is still of interest to log security events, such as successful attempts to open files.

Furthermore, after audit files have been made, the audit files can be reviewed. An audit file allows a security administrator to later review the security events that have occurred over time with respect to the file security system. Examples of security events could be successful attempts to open files, failed attempts to open files, changes to authorized users, new security classifications, etc. The audit files enable the security administrator to diagnose conditions of the file security system. Typically, file security systems are often distributed across multiple machines and multiple locations, but are interconnected via a network (e.g., client-server environment). In contrast, the security administrator often resides at a central location. Hence, the file security system needs to transfer audit files to the central location.

Auditing requires that events being monitored be time stamped. Although clients have clocks and can provide timestamps, time stamping by clients can be inaccurate or unreliable due to inaccurate clocks or tampering of clocks at the clients. Alternatively, time stamping by a server is accurate and reliable, but requires large amounts of network bandwidth, because time stamping at the server must be synchronized with events occurring at the clients. The reliability of a timestamp may be partially conferred by cryptographic signing of the timestamp (this may require specialized hardware for speed—which is impractical to install on every client and may also require presence of sensitive cryptographic keys at the clients which is undesirable in a secure environment and subject to tampering). The reliability of a timestamp may also be partially conferred by synchronization of system time with a provably good source, such as an RFC-1305 transmission from a NIST time server. However, synchronization of system time at client devices entails extra machine code, processing resources, network bandwidth, and network access on the client that receives such RFC-1305 transmissions.

Thus, there is a need for reliable and bandwidth-efficient methods to time stamp events (e.g., audit events) on the server, after they occur at clients of a client-server environment.

SUMMARY OF THE INVENTION

Broadly speaking, the invention relates to improved techniques for validating timestamps used in a client-server environment. A client can associate client-provided timestamps with events that occur at the client. The client can then send event information as well as the timestamps to a server. Preferably, for reasons of minimizing the per-transmission network overhead, the event information and time stamps are sent in a batch pertaining to a plurality of events that have occurred at the client. The server, which has greater time accuracy, can then validate the client-provided timestamps. The server can also modify the client-provided timestamps so as to improve accuracy of the timestamps. Once modified, the timestamps can pertain to a range (e.g., window) of time during which the associated events can be reliably known to have occurred.

In one embodiment, the client-server environment is a distributed file security system. A client sends audit files to a central server (e.g., audit server), thereby facilitating review of the audit files. The audit files can pertain to batches of audit events with associated event information and timestamps. The distributed file security system provides efficient and reliable techniques to ensure accuracy of client-provided timestamps.

The invention can be implemented in numerous ways, including as a method, system, device, and computer readable medium. Several embodiments of the invention are discussed below.

As a method for time stamping events occurring in a client-server software system, where the client-server software system operates on at least one client and at least one server, one embodiment of the invention includes at least the acts of: receiving a group of events at the server, the events being associated with the client, and each of the events including at least event information and a client timestamp; evaluating at least one of the client timestamps for the group of events to determine whether the client timestamps are reliable; and modifying the client timestamps dependent upon whether the client timestamps have been determined to be reliable.

As a method for time stamping audit events of a client-server software system, one embodiment of the invention includes at least the acts of: receiving audit events that occur at a client program of the client-server software system, each of the audit events having at least a client timestamp and an audit descriptor to describe the event; transmitting a batch of the audit events to a server program of the client-server software system; validating the client timestamps for the audit events in the batch against one or more server timestamps; and modifying the client timestamps.

As an audit system for a client-server software system, where the client-server software system operates on at least one client and at least one server, one embodiment of the invention includes at least: an audit event monitor for receiving events associated with at least one client process of the client-server software program operating on the client, each of the events including at least event information and a client timestamp; a batch sender operating on the client to send the events received by the audit event monitor to the server in a batch; a batch receiver operating on the server to receive the batch of the events from the batch sender; and a timestamp manager operating on the server to validate the client timestamps of the events in the batch received by the batch receiver based on an accurate time reference available to the server.

An audit system for a client-server software system, where the client-server software system operates on at least one client and at least one server, another embodiment of the invention includes at least: an audit event monitor for receiving events associated with at least one client process of the client-server software program operating on the client, each of the events including at least event information and a client timestamp; a batch sender operating on the client to send the events received by the audit event monitor to the server in a batch; a batch receiver operating on the server to receive the batch of the events from the batch sender; and a timestamp manager operating on the server to validate the client timestamps of the events in the batch received by the batch receiver based on an accurate time reference available to the server.

As a computer readable medium including at least computer program code for time stamping events occurring in a client-server software system, the client-server software system operating on at least one client and at least one server, one embodiment of the invention includes at least: computer program code for receiving a group of events at the server, the events being associated with the client, and each of the events including at least event information and a client timestamp; computer program code for evaluating at least one of the client timestamps for the group of events to determine whether the client timestamps are reliable; and computer program code for modifying the client timestamps dependent upon whether the client timestamps have been determined to be reliable.

Other aspects and advantages of the invention will become apparent from the following detailed description, taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for validating timestamps used in a client-server environment. A client can associate client-provided timestamps with events that occur at the client. The client can then send event information as well as the timestamps to a server. Preferably, for reasons of minimizing the per-transmission network overhead, the event information and time stamps are sent in a batch pertaining to a plurality of events that have occurred at the client. The server, which has greater time accuracy, can then validate the client-provided timestamps. The server can also modify the client-provided timestamps so as to improve accuracy of the timestamps. Once modified, the timestamps can pertain to a range (e.g., window) of time during which the associated events can be reliably known to have occurred.

In one embodiment, the client-server environment is a distributed file security system. A client sends audit files to a central server (e.g., audit server), thereby facilitating review of the audit files. The audit files can pertain to batches of audit events with associated event information and timestamps. The distributed file security system provides efficient and reliable techniques to ensure accuracy of client-provided timestamps.

In the following description, numerous specific details are set forth in order to provide a thorough understanding of the invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1-6. However, those skilled in the art will readily appreciate that the detailed description given herein with respect to these figures is for explanatory purposes as the invention extends beyond these limited embodiments.

Figure 1:
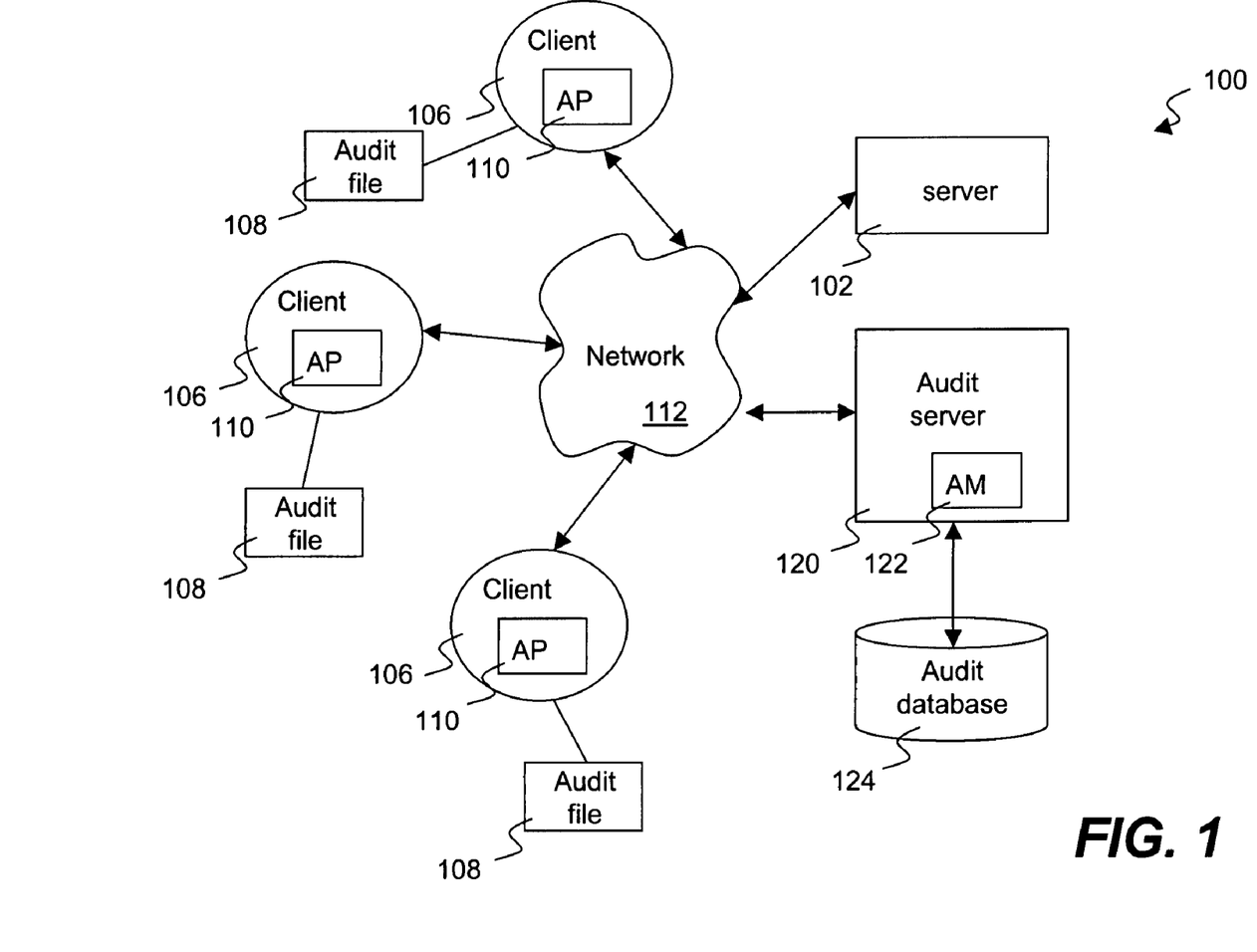
FIG. 1 is a block diagram of a file security system according to one embodiment of the invention.

FIG. 1 is a block diagram of a file security system 100 according to one embodiment of the invention. The file security system 100 operates to restrict access to files stored within a computing environment associated with the file security system 100. The computing environment is a distributed computing system having a server 102 and clients 106. A user at one of the clients 106 can create a secured file having restricted access. For example, the access to the secured file can be limited to certain other users. The access to the secured file can also be limited to certain time periods, certain uses and/or certain other computers, etc. In gaining access to a secured file, a user at one of the clients 106 would interact with the server 102 to receive keys, access rules, user groups, etc. that are needed to gain access to the secured file.

Additionally, as the clients 106 operate in the context of the file security system 100 to provide restricted access to files, each computing machine within the file security system 100 can produce an audit file. Namely, the clients 106 can produce audit files 108. In addition, the server 102 might produce an audit file. The audit files contain audit information. In one embodiment, the audit information includes audit events and associated timestamps. Typically, an administrator (e.g., security administrator) of the file security system 100 could interact with the server 102. In one situation, the administrator would desire to review audit information that has been acquired by the file security system 100.

Hence, the audit files which are locally created by the various computing machines need to be transmitted to a central resource. The various computing devices make use of audit processors (APs) to create and transfer the audit files. Each of the clients 106 includes an audit processor (AP) 110.

As shown in FIG. 1, the clients 106 couple to a network 112. The server 102, as well as an audit server 120, couple to the network 112. The audit server 120 is shown as a separate centralized server for managing the audit information acquired by the file security system 100. However, it should be noted that in another embodiment, the audit server 120 could be within the server 102. The audit server 120 includes an audit manager (AM) 122 that communicates with one or more audit processors 110 within the clients 106 so as to receive the audit files. The audit manager 122 also validates (and possibly modifies) the timestamps within the audit files so as to guarantee accuracy of the timestamps. The audit server 120 further couples to an audit database 124. The audit database 124 contains the audit files that have been received at the audit server 120 from the computing devices within the file security system 100 (e.g., the clients 106). As noted above, the audit server 120 may also process the audit files prior to storage to the audit database 124 for purposes of timestamp validation and/or modification. In any case, the security administrator for the file security system 100 can access the audit database 124 to review and analyze the audit files acquired by the various components of the file security system 100. The review of the audit files would allow the security administrator to diagnose problems with the system, detect attempts for unauthorized access, detect security breaches, and the like. In other words, the file security system 100 includes an audit system that allows capture, storage and review of audit information.

Figure 2A:
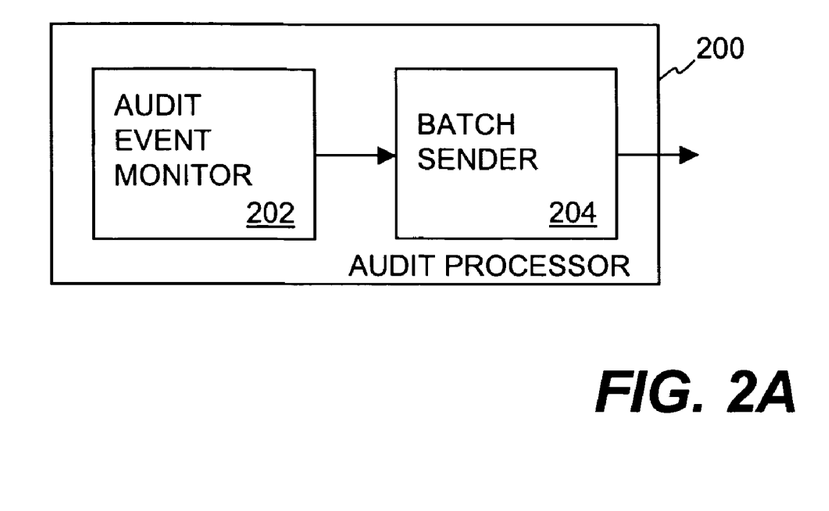
FIG. 2A is a block diagram of an audit processor according to one embodiment of the invention.

FIG. 2A is a block diagram of an audit processor 200 according to one embodiment of the invention. The audit processor 200 represents an embodiment of the audit processor 110 provided within each of the clients 106 illustrated in FIG. 1. The audit processor 200 includes an audit event monitor 202 and a batch sender 204. The audit event monitor 202 receives audit events initiated by software operating on the respective client 106. The audit event monitor 202 forwards audit events to a batch sender 204. The batch sender 204 accumulates a plurality of audit events and then sends the batch to an audit manager residing at a server, namely, an audit server (i.e., audit server 120). A batch is a group of audit events, typically temporally ordered by occurrence. In one embodiment, the batch (e.g., audit batch) is sent to the audit manager in a server as a file (i.e., audit file). In this regard, audit events are transmitted over a network to a server in a batch mode such that load on the network is manageable. An administrator of the audit system (e.g., file security system 100) can control the size of the batches and the frequency at which batches are sent, to provide control over network bandwidth usage.

Figure 2B:
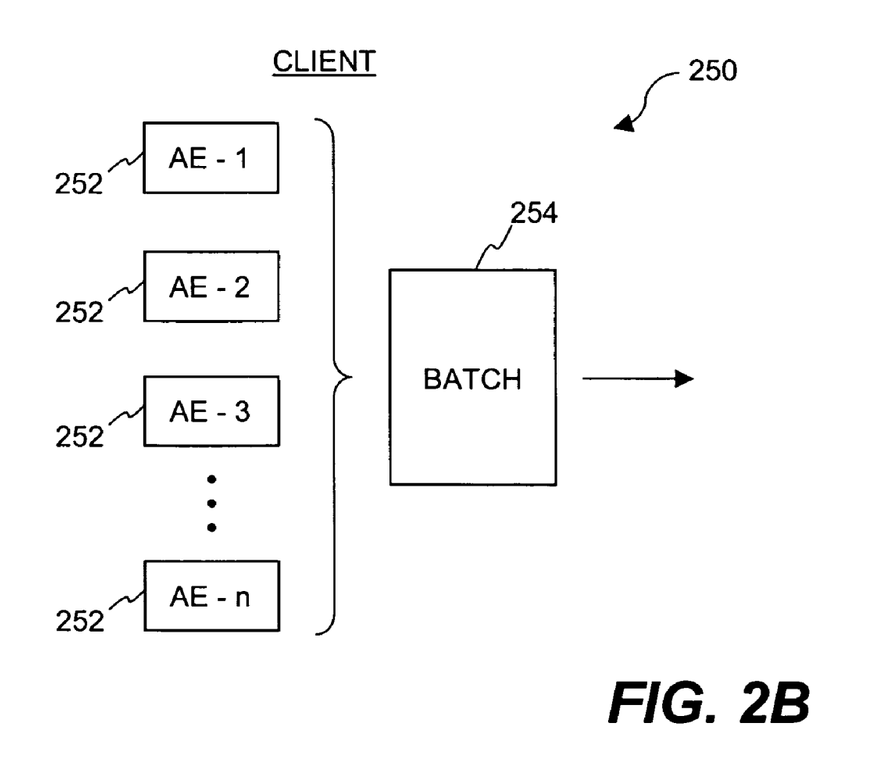
FIG. 2B illustrates a batch arrangement according to one embodiment of the invention.

FIG. 2B illustrates a batch arrangement 250 according to one embodiment of the invention. The batch arrangement 250 illustrates a series of audit events 252 indicated as AE-1, AE-2, AE-3, . . . , AE-n. These audit events 252 can be accumulated into a batch 254. The batch 254 can thereafter be sent to an audit manager (e.g., audit manager 122). With respect to FIG. 2A, the audit event monitor 202 would provide the audit events (AE) 252 to the batch sender 204 that would produce and send the batch 254.

Figure 3A:
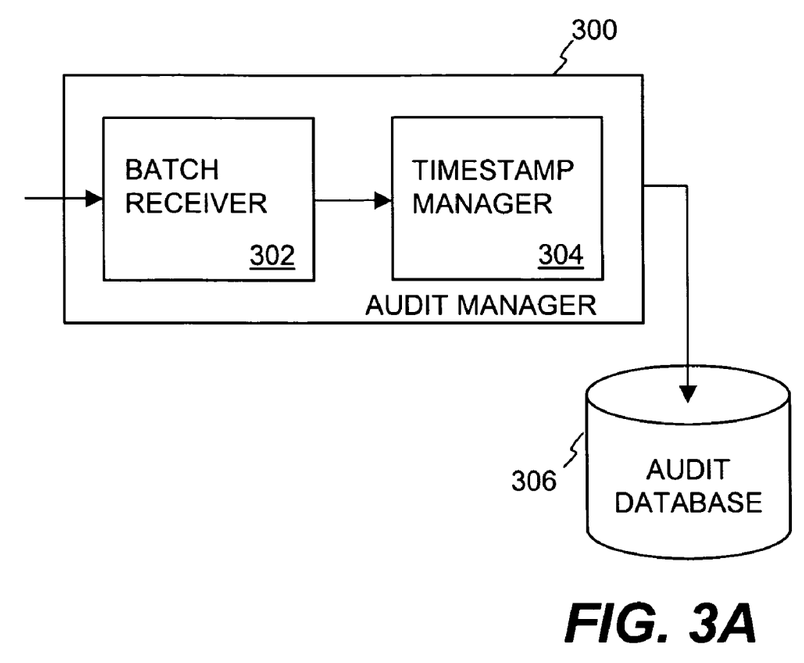
FIG. 3A is a block diagram of an audit manager according to one embodiment of the invention.

FIG. 3A is a block diagram of an audit manager 300 according to one embodiment of the invention. The audit manager 300 resides on a server, such as an audit server. The audit manager 300 includes a batch receiver 302 and a timestamp manager 304. The batch receiver 302 receives an incoming batch that is provided to the server by an audit processor (such as the audit processor 200 illustrated in FIG. 2A). The timestamp manager 304 can receive the batch from the batch receiver 302 and then perform operations to evaluate and perhaps modify the timestamps associated with the audit events in the incoming batch. Finally, the timestamp manager 304 can store the audit events to an audit database 306. Thereafter, the audit system can enable evaluation of the numerous audit events stored to the audit database 306. Such analysis can be used formulate reports, analyze operation, verify existence of events or items, etc.

Figure 3B:
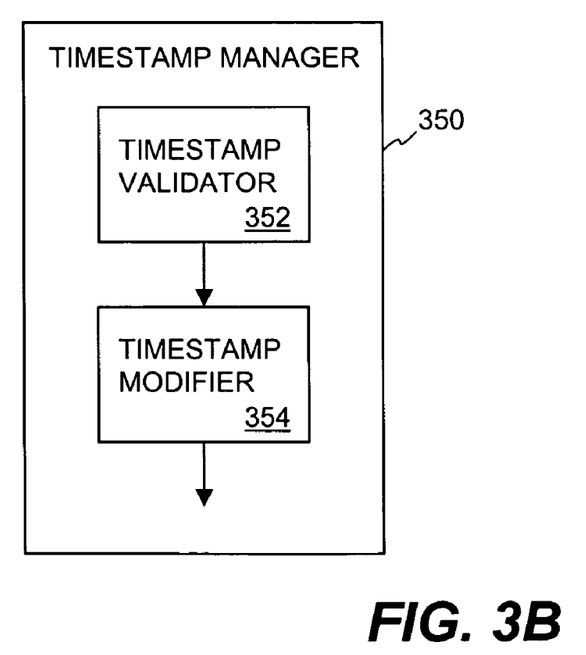
FIG. 3B is a block diagram of a timestamp manager according to one embodiment of the invention.

FIG. 3B is a block diagram of a timestamp manager 350 according to one embodiment of the invention. The timestamp manager 350 is, for example, suitable for use as one embodiment of the timestamp manager 304 illustrated in FIG. 3A. The timestamp manager 350 includes a timestamp validator 352 and a timestamp modifier 354. The timestamp validator 352 can determine whether timestamps provided with audit events (received from clients) are reliable, as a group and/or individually. The timestamp modifier 354 can then modify the timestamps as appropriate depending upon whether the client-provided timestamps are reliable or unreliable. Consequently, the timestamps of the audit information stored to the audit database have been processed by the timestamp manager 350 within the audit server so that they are deemed to be reliable and trustworthy.

Figure 4:
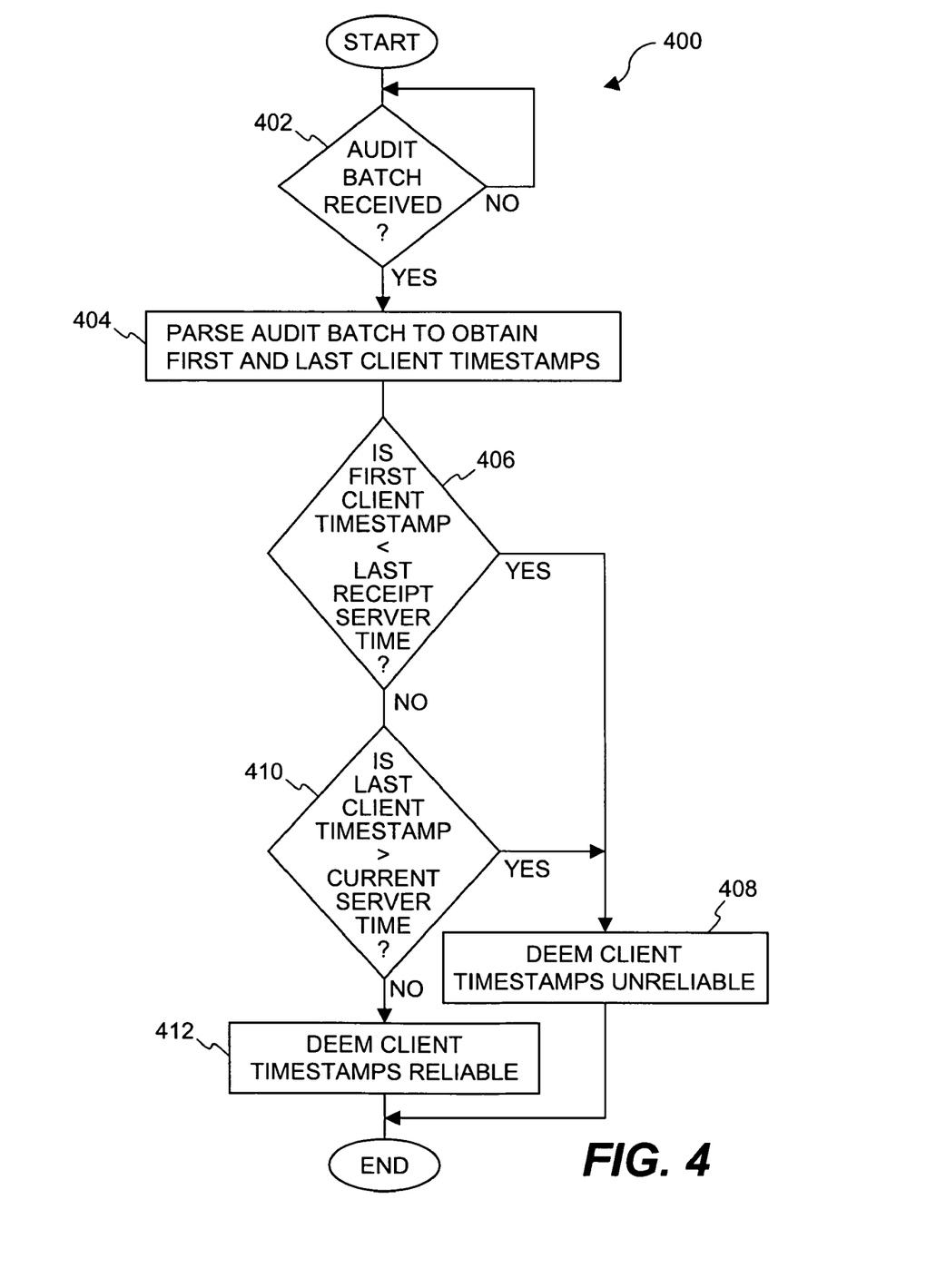
FIG. 4 is a flow diagram of a timestamp evaluation process according to one embodiment of the invention.

FIG. 4 is a flow diagram of a timestamp evaluation process 400 according to one embodiment of the invention. The timestamp evaluation process 400 is performed at a server, such as the audit server 120 illustrated in FIG. 1.

The timestamp evaluation process 400 begins with a decision 402 that determines whether an audit batch has been received. Here, audit batches are provided to the server via a network by various clients. Hence, when the decision 402 determines that an audit batch has not been received, then the timestamp evaluation process 400 awaits receipt of an audit batch.

Once the decision 402 determines that an audit batch has been received, then the audit batch can be processed to determine whether client-provided timestamps are reliable. When the processing of the audit batch begins, the audit batch is parsed 404 to obtain first and last client timestamps. Here, in one embodiment, each audit event within the audit batch has a client timestamp. Hence, the first and last client timestamps can pertain to the client timestamps associated with the first and last audit events within the audit batch. The audit events are typically temporally ordered in the audit batch.

Next, a decision 406 determines whether the first client timestamp is less than a last receipt server time. Here, the last receipt server time is a time at which the server last received an audit batch from the same client. When the decision 406 determines that the first client timestamp is less than the last receipt server time, then the client timestamps associated with the audit batch being processed are deemed 408 unreliable. Alternatively, when the decision 406 determines that the first client timestamp is not less than the last receipt server time, a decision 410 determines whether the last client timestamp is greater than a current server time. Here, the current server time represents the time (as understood by the server) when the audit batch is received at the server. Typically, a server has a reliable timestamp capability that is relatively secure and tamper proof. When the decision 410 determines that the last client timestamp is greater than the current server time, the client timestamps associated with the audit batch being processed are also deemed 408 unreliable. On the other hand, when the decision 410 determines that the last client timestamp is not greater than the current server time, the client timestamps associated with the audit batch being processed are deemed 412 reliable.

Following the operations 408 and 412, the timestamp evaluation process 400 is complete and ends. However, it should be noted that the timestamp evaluation process 400 represents processing performed on each audit batch being received at the server.

Figure 5:
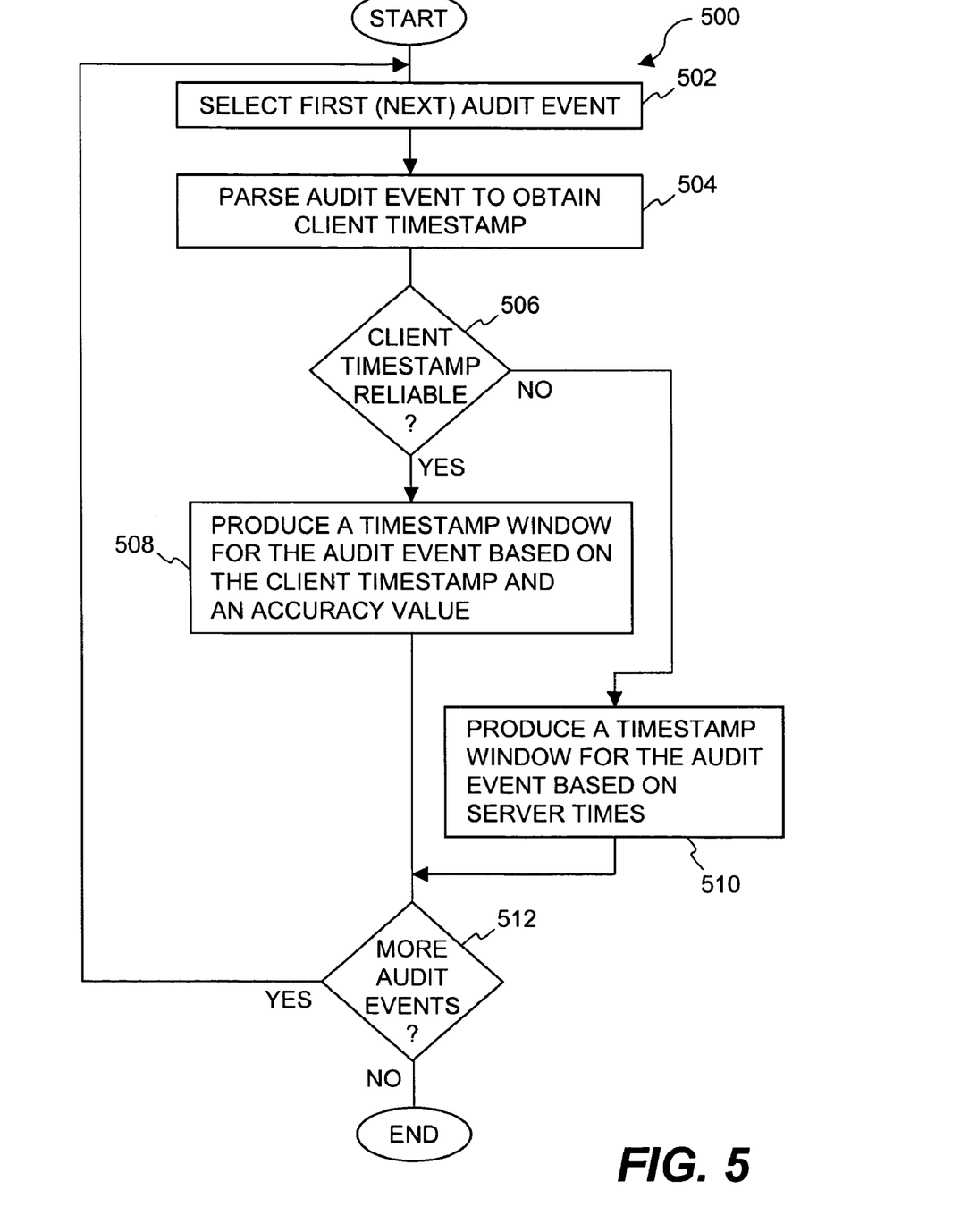
FIG. 5 is a flow diagram of a timestamp modification process according to one embodiment of the invention.

FIG. 5 is a flow diagram of a timestamp modification process 500 according to one embodiment of the invention. The timestamp modification process 500 represents processing that can be implemented at an audit manager of a server according to one embodiment of the invention. For example, the timestamp modification process 500 can be performed by the timestamp modifier 354 of the timestamp manager 350 illustrated in FIG. 3B. The timestamp modification process 500 is performed on an audit batch, that is a batch of audit events, provided to the server by a client.

The timestamp modification process 500 initially selects 502 a first audit event to be processed. Then, the audit event is parsed 504 to obtain a client timestamp associated the audit event. Each audit event in the audit batch has an associated client timestamp.

Next a decision 506 determines whether the client timestamp is reliable. Here, the timestamp modification process 500 operates to modify the client timestamps as appropriate depending upon whether they have been determined to be reliable or unreliable. In one embodiment, the reliability of the client timestamp for the audit events in the audit batch can have already been determined by the timestamp evaluation process 400 as illustrated in FIG. 4. In another embodiment, audit events are assumed to have been generated in a non-decreasing temporal sequence; if, therefore, the client timestamp for audit event AE (N) is less than the client timestamp for the previous audit event AE (N−1), the client timestamp for AE (N) can be deemed unreliable. Hence, when the decision 506 determines that the client timestamp is reliable, a timestamp window for the audit event being processed can be produced 508 based on the client timestamp and an accuracy value. Here, the timestamp window expands the client timestamp to a window (or range) that has a width that depends upon an accuracy value. The accuracy value can reflect network delays or other inaccuracies that may appear in the client timestamp. Hence, the timestamp window represents a window (or range) of time in which the audit event can accurately be said to have occurred. For example, if the client timestamp was 16:20:00 (hours:minutes:second) and the accuracy value is five (5) seconds, the timestamp window produced at the server could be: 16:19:55 through 16:20:05.

On the other hand, when the decision 506 determines that the client timestamp is not reliable (i.e., unreliable), a timestamp window for the audit event is produced 510 based on server times. Here, the client timestamp is deemed unreliable so that the client timestamp is not used in producing the timestamp window for the audit event. Instead, known server times are utilized in forming the timestamp window for such an audit event. As one example, the server times being utilized can represent a window (or range) formed by the last receipt server time and the current server time for the associated audit batch (see FIG. 4). The size of the window is dependent on the rate at which audit batches are sent to the server. Hence, there is a tradeoff in network bandwidth consumption (which increases with more frequent sending of audit batches) verses worst-case server timestamp accuracy (directly related to window size, which decreases with more frequent sending of audit batches).

In any case, following the operations 508 and 510, a decision 512 determines whether there are more audit events to be processed. Typically, the timestamp modification process 500 processes an audit batch having a plurality of audit events. Hence, the timestamp modification process 500 typically repeats so as to process each of the audit events in the audit batch. More particularly, when the decision 512 determines that there are more audit events to be processed, the timestamp modification process 500 returns to repeat the block 502 and subsequent blocks so that a next audit event in the batch can be similarly processed. Alternatively, when the decision 512 determines that there are no more audit events to be processed, the timestamp modification process 500 is complete and ends.

Figure 6:
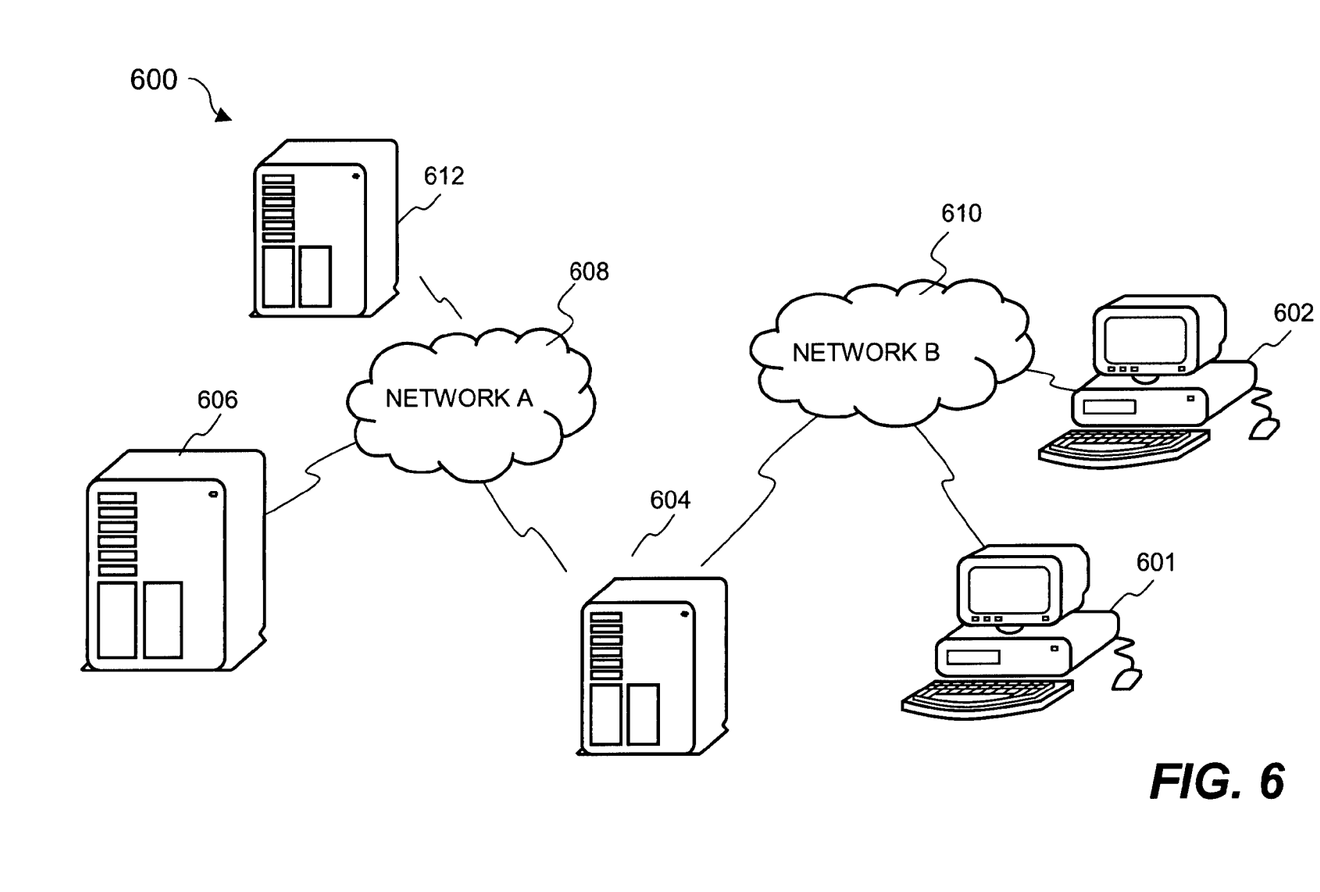
FIG. 6 shows a basic security system in which the invention may be practiced in accordance with one embodiment thereof.

FIG. 6 shows a basic security system 600 in which the invention may be practiced in accordance with one embodiment thereof. The security system 600 may be employed in an enterprise or inter-enterprise environment having a network A 608 and a network B 610. The security system 600 includes a first server 606 (also referred to as a central server) providing centralized access management for the enterprise. The first server 606 can control restrictive access to files secured by the security system 600. To provide dependability, reliability and scalability of the system, one or more second servers 604, 612 (also referred to as local servers, of which one is shown) may be employed to provide backup or distributed access management for users of client machines serviced locally. For illustration purposes, there are two client machines 601 and 602 being serviced by the second server 604. Alternatively, one of the client machines 601 and 602 may be considered as a networked storage device.

Additional details on audit systems can be found in U.S. patent application Ser. No. 10/642,041, filed Aug. 15, 2003, and entitled "METHOD AND SYSTEM FOR FAULT-TOLERANT TRANSFER OF FILES ACROSS A NETWORK," which is hereby incorporated herein by reference. Additional details on a security system can be found in U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that reliable timestamps can be obtained from a client in a client-server environment. Another advantage of the invention is that network bandwidth is managed by asynchronous sending of audit events in batches to a server. Still another advantage of the invention is that timestamps obtained from clients can be modified at the server when determined to be unreliable.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for time stamping events occurring in a client-server software system, the client-server software system operating on at least one client and at least one server, the method comprising:
   receiving a group of events at a server, each event being associated with a client and log information including an event designator, event information, and a client timestamp;
   evaluating, on the server, the client timestamps of the group of events to determine whether the client timestamps are reliable based on the accuracy of the client timestamps; and
   modifying, on the server, client timestamps of the group if it is determined that the client timestamps are unreliable.

2. The method as recited in claim 1, wherein the receiving includes receiving the group of events as a batch.

3. The method as recited in claim 1, wherein there is a number of events associated with the group of events and the number of events in the group of events is controllable.

4. The method as recited in claim 1, wherein the evaluating includes comparing at least one timestamp with at least one server provided time reference.

5. The method as recited in claim 1, wherein the evaluating comprises:
   the server obtaining an earliest client timestamp and a latest client timestamp from the group of events;
   the server comparing the earliest client timestamp with a first server reference time;
   the server comparing the latest client timestamp with a second server reference time; and
   the server determining the client timestamps to be reliable if:
   the comparing indicates that the earliest client timestamp is not earlier than the first server reference time; and
   the comparing indicates that the latest client timestamp is not later than the second server reference time.

6. The method as recited in claim 5, wherein the first server reference time is a last receipt server time at which a prior group of events was received at the server from the client, and the second server reference time is a current server time at which the group of events was received at the server from the client.

7. The method as recited in claim 6, wherein modifying the client timestamps on the server operates to define a range of time.

8. The method as recited in claim 7, wherein the range of time is a validated timestamp window.

9. The method as recited in claim 7, wherein the range of time is dependent on whether the client timestamps have, on the server, been determined to be reliable.

10. The method as recited in claim 7, wherein if, on the server, the client timestamps are determined to be reliable, the range of time for each of the client timestamps is dependent on the client timestamp and an accuracy value.

11. The method as recited in claim 7, wherein if, on the server, the client timestamps are determined to be unreliable, the range of time for each of the client timestamps is dependent on the first and second server reference times.

12. A method for time stamping audit events of a client-server software system, the method comprising:
   receiving, at a server, a batch transmission of audit events that occur at a client, wherein each of the audit events is associated with log information including at least an event designator, a client timestamp, and an audit descriptor to describe the audit event;
   validating, at the server, the client timestamps for the audit events in the batch against one or more server timestamps; and
   modifying, at the server, the client timestamps if the validating determines that the timestamps are unreliable based on the accuracy of the client timestamps.

13. The method as recited in claim 12, wherein, after the validating operates to validate one of the client timestamps, the modifying operates to modify one of the client timestamps to provide a validated timestamp window for the audit event associated therewith.

14. The method as recited in claim 13,
   wherein the client-server software system includes a client program and a server program that communicate through a network, and
   wherein the validated timestamp window has a width that is dependent on at least network delay of communications between the client program and the server program.

15. The method as recited in claim 13, wherein the validated timestamp window is formed from one of the client timestamps plus and minus a value, thereby forming two endpoints of the validated timestamp window.

16. The method as recited in claim 15, wherein the value is dependent on at least network delay between the client program and the server program.

17. The method as recited in claim 12, wherein the batch has a batch size.

18. The method as recited in claim 17, wherein the batch size is dependent on an elapsed time.

19. The method as recited in claim 17, wherein the batch size is dependent on an administrator action.

20. The method as recited in claim 13, wherein the validated timestamp window has a width that is dependent on a current server time and a last validated server time.

21. The method as recited in claim 13, wherein the validating provides an indication of whether one of the client timestamps is reliable or unreliable, and wherein the validated timestamp window has a width that is dependent on whether one of the client timestamps is reliable or unreliable.

22. An audit system for a client-server software system, the client-server software system operating on at least one client and at least one server, the system comprising:
   a component configured to receive events associated with at least one client process of the client-server software system operating on a client, wherein each event is associated with log information including an event designator, event information, and a client timestamp; and a component configured to validate the client timestamps of the events based on comparing the client timestamps to accurate time reference available to the server.

23. The audit system as recited in claim 22, wherein the component configured to validate the client timestamps further modifies the client timestamps dependent on the validation of the client timestamps.

24. The audit system as recited in claim 23, wherein, if the component configured to validate the client timestamps modifies the client timestamps, the modified client timestamps define a range of time.

25. The audit system as recited in claim 24, wherein the range of time is dependent on the validation of the client timestamps.

26. The audit system as recited in claim 24, wherein the validation of the client timestamps determines whether the client timestamps are reliable, and wherein the range of time is dependent on whether or not the client timestamps are determined to be reliable.

27. A tangible computer readable medium having instructions stored thereon for time stamping events occurring in a client-server software system, the client-server software system operating on at least one client and at least one server, the instructions comprising:
- instructions to receive a group of events wherein each of the events is associated with a client and log information including at least an event designator, event information, and a client timestamp;
- instructions to evaluate at least one of the client timestamps of the group of events to determine whether the client timestamps are reliable; and
- instruction to modify the client timestamps if the evaluating determines that the client timestamps are unreliable based on the accuracy of the client timestamps.

28. The computer readable medium as recited in claim 27, wherein modifying the client timestamps operates to modify the client timestamps to provide a range of time.

29. The computer readable medium as recited in claim 28, wherein the range of time is dependent on whether the client timestamps have been determined to be reliable.

30. The computer readable medium as recited in claim 28, wherein if the client timestamps are determined to be reliable, the range of time for each of the client timestamps is dependent on the client timestamp and an accuracy value.

31. The computer readable medium as recited in claim 28, wherein if the client timestamps are determined to be unreliable, the range of time for each of the client timestamps is dependent on a first and second server reference times.

32. The computer readable medium as recited in claim 27, wherein the instructions to evaluate comprise instruction to compare the at least one of the client timestamps with at least one server provided time reference.

33. The computer readable medium as recited in claim 27, the instructions further comprising:
- instructions to obtain computer program code for an earliest client timestamp and a latest client timestamp from the client timestamps of the group of events;
- instructions to compare computer program code for earliest client timestamp with a first server reference time;
- instructions to compare computer program code for the latest client timestamp with a second server reference time; and
- instructions to determine computer program code for the client timestamps to be reliable if:
  - the comparing indicates that the earliest client timestamp is not earlier than the first server reference time; and
  - the comparing indicates that the latest client timestamp is not later than the second server reference time.

34. The computer readable medium as recited in claim 33, wherein the first server reference time is a last receipt server time in which a prior group of events was received at the server from the client, and the second server reference server time is a current server time in which the group of events was received at the server from the client.

35. The computer readable medium as recited in claim 27, wherein the events are audit events.

\* \* \* \* \*